(12) United States Patent
Blum et al.

(10) Patent No.: US 11,748,514 B2
(45) Date of Patent: *Sep. 5, 2023

(54) DATA CLEAN ROOM

(71) Applicant: Snowflake Inc., Bozeman, MT (US)

(72) Inventors: Rachel Frances Blum, South Orange, NJ (US); Joshua James Chacona, North Hollywood, CA (US); Christian Kleinerman, Burlingame, CA (US); Justin Langseth, Kailua, HI (US); William L. Stratton, Jr., Atlanta, GA (US)

(73) Assignee: Snowflake Inc., Bozeman, MT (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/160,924

(22) Filed: Jan. 28, 2021

(65) Prior Publication Data

US 2022/0035949 A1 Feb. 3, 2022

Related U.S. Application Data

(63) Continuation of application No. 16/944,929, filed on Jul. 31, 2020, now Pat. No. 10,970,419.

(51) Int. Cl.
*G06F 21/62* (2013.01)
*G06F 16/22* (2019.01)
*G06F 16/2455* (2019.01)

(52) U.S. Cl.
CPC ...... *G06F 21/6254* (2013.01); *G06F 16/2282* (2019.01); *G06F 16/2455* (2019.01); *G06F 21/6263* (2013.01)

(58) Field of Classification Search
CPC .......... G06F 21/6254; G06F 16/2282; G06F 16/2455; G06F 21/6263
See application file for complete search history.

(56) References Cited

U.S. PATENT DOCUMENTS

| | | | |
|---|---|---|---|
| 7,392,391 | B2 | 6/2008 | Eibach et al. |
| 9,201,924 | B1 | 12/2015 | Fuller |
| 10,769,148 | B1 | 9/2020 | Binkert et al. |
| 10,885,032 | B2 | 1/2021 | Willems et al. |

(Continued)

FOREIGN PATENT DOCUMENTS

WO 2022026107 2/2022

OTHER PUBLICATIONS

"International Application Serial No. PCT/US2021/039775, International Search Report dated Jul. 28, 2021", 3 pgs.

(Continued)

*Primary Examiner* — Catherine Thiaw
(74) *Attorney, Agent, or Firm* — Schwegman Lundberg & Woessner, P.A.

(57) ABSTRACT

Embodiments of the present disclosure may provide a data clean room allowing secure data analysis across multiple accounts, without the use of third parties. Each account may be associated with a different company or party. The data clean room may provide security functions to safeguard sensitive information. For example, the data clean room may restrict access to data in other accounts. The data clean room may also restrict which data may be used in the analysis and may restrict the output. The overlap data may be anonymized to prevent sensitive information from being revealed.

20 Claims, 11 Drawing Sheets

(56) References Cited

U.S. PATENT DOCUMENTS

| | | | |
|---|---|---|---|
| 10,936,744 B1* | 3/2021 | Trepetin | H04L 9/0861 |
| 10,970,419 B1 | 4/2021 | Blum et al. | |
| 11,321,330 B1 | 5/2022 | Pandis et al. | |
| 2014/0095540 A1 | 4/2014 | Hsiao et al. | |
| 2014/0365363 A1 | 12/2014 | Knudsen et al. | |
| 2015/0081918 A1 | 3/2015 | Nowack et al. | |
| 2016/0261575 A1 | 9/2016 | Maldaner | |
| 2017/0026343 A1 | 1/2017 | Wardman | |
| 2017/0116272 A1 | 4/2017 | Lahorani et al. | |
| 2018/0082237 A1 | 3/2018 | Nagel et al. | |
| 2018/0218173 A1* | 8/2018 | Perkins | G06F 21/6254 |
| 2019/0026709 A1 | 1/2019 | Baron | |
| 2019/0147451 A1 | 5/2019 | Deutschmann et al. | |
| 2019/0362101 A1 | 11/2019 | Fisse et al. | |
| 2020/0067933 A1 | 2/2020 | Kukreja et al. | |
| 2020/0074466 A1 | 3/2020 | Kurian et al. | |
| 2020/0175008 A1 | 6/2020 | Bensberg et al. | |
| 2020/0244626 A1 | 7/2020 | Kwon et al. | |
| 2020/0258605 A1 | 8/2020 | Blechman | |
| 2020/0387507 A1 | 12/2020 | Li et al. | |
| 2021/0026986 A1* | 1/2021 | Woessner | G06F 21/6263 |
| 2022/0012361 A1* | 1/2022 | Eberlein | G06F 17/16 |

OTHER PUBLICATIONS

"International Application Serial No. PCT/US2021/039775, Written Opinion dated Jul. 28, 2021", 5 pgs.

"U.S. Appl. No. 16/944,929, Examiner Interview Summary dated Jan. 26, 2021", 2 pgs.

"U.S. Appl. No. 16/944,929, Non Final Office Action dated Oct. 20, 2020", 13 pgs.

"U.S. Appl. No. 16/944,929, Notice of Allowance dated Feb. 8, 2021", 8 pgs.

"U.S. Appl. No. 16/944,929, Response filed Jan. 20, 2021 to Non-Final Office Action dated Oct. 20, 2020", 12 pgs.

U.S. Appl. No. 16/944,929, U.S. Pat. No. 10,970,419, filed Jul. 31, 2020, Data Clean Room.

"European Application Serial No. 21850075.9, Response filed Sep. 19, 2022 to Communication pursuant to Rules 161 and 162 dated Mar. 17, 2022", 16 pgs.

"U.S. Appl. No. 18/104,281, Preliminary Amendment filed Feb. 1, 2023", 8 pgs.

"International Application Serial No. PCT/US2021/039775, International Preliminary Report on Patentability dated Feb. 9, 2023", 7 pgs.

"U.S. Appl. No. 18/104,281, Non-Final Office Action dated Apr. 6, 2023", 16 pgs.

* cited by examiner

DATA CLEAN ROOM

CLAIM OF PRIORITY

This application is a continuation of U.S. patent application Ser. No. 16/944,929, filed Jul. 31, 2020, which is incorporated by reference herein in its entirety.

TECHNICAL FIELD

The present disclosure generally relates to securely analyzing data across different accounts using a data clean room.

BACKGROUND

Currently, most digital advertising is performed using third-party cookies. Cookies are small pieces of data generated and sent from a web server and stored on the user's computer by the user's web browser that are used to gather data about customers' habits based on their website browsing history. Because of privacy concerns, the use of cookies is being restricted.

Companies may want to create target groups for advertising or marketing efforts for specific audience segments. To do so, companies may want to compare their customer information with that of other companies to see if their customer lists overlap for the creation of such target groups. Thus, companies may want to perform data analysis, such as an overlap analysis, of their customers or other data. To perform such types of data analyses, companies can use "trusted" third parties, who can access data from each of the companies and perform the data analysis. However, this third-party approach suffers from significant disadvantages. First, companies give up control of their customer data to these third parties, which can lead to unforeseen and harmful consequences because this data can contain sensitive information, such as personal identity information. Second, the analysis is performed by the third parties, not the companies themselves. Thus, the companies have to go back to the third parties to conduct a more detailed analysis or a different analysis. This can increase the expense associated with the analysis as well as add a time delay. Also, providing such information to third parties for this purpose may run afoul of ever-evolving data privacy regulations and common industry policies.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure may provide a data clean room allowing secure data analysis across multiple accounts, without the use of third parties. Each account may be associated with a different company or party. The data clean room may provide security functions to safeguard sensitive information. For example, the data clean room may restrict access to data in other accounts. The data clean room may also restrict which data may be used in the analysis and may restrict the output. For example, the output may be restricted based on a minimum threshold of overlapping data (e.g., elements per output data row). Therefore, each account (e.g., company, party) may keep control of its data in its own account while being able to perform data analysis using its own data and data from other accounts. Each account may set policies for which types of data and which types of analysis it is willing to allow other accounts to perform. The overlap data may be anonymized to prevent sensitive information from being revealed.

Figure 1:
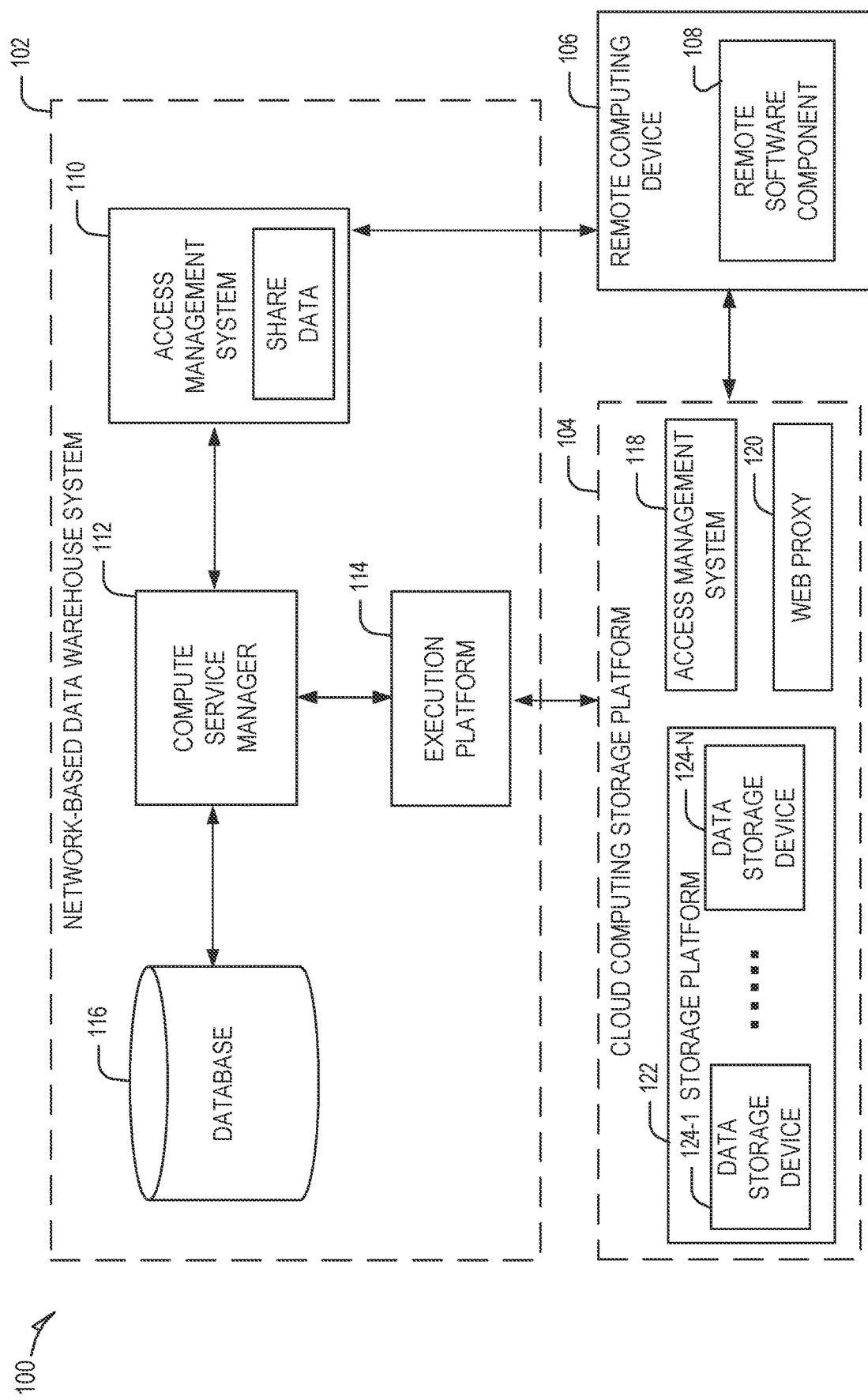
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-*n* that are part of a cloud computing storage platform 104. In some embodiments, data storage devices 124-1 to 124-*n* are cloud-based storage devices located in one or more geographic locations. For example, data storage devices 124-1 to 124-*n* may be part of a public cloud infrastructure or a private cloud infrastructure. Data storage devices 124-1 to 124-*n* may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
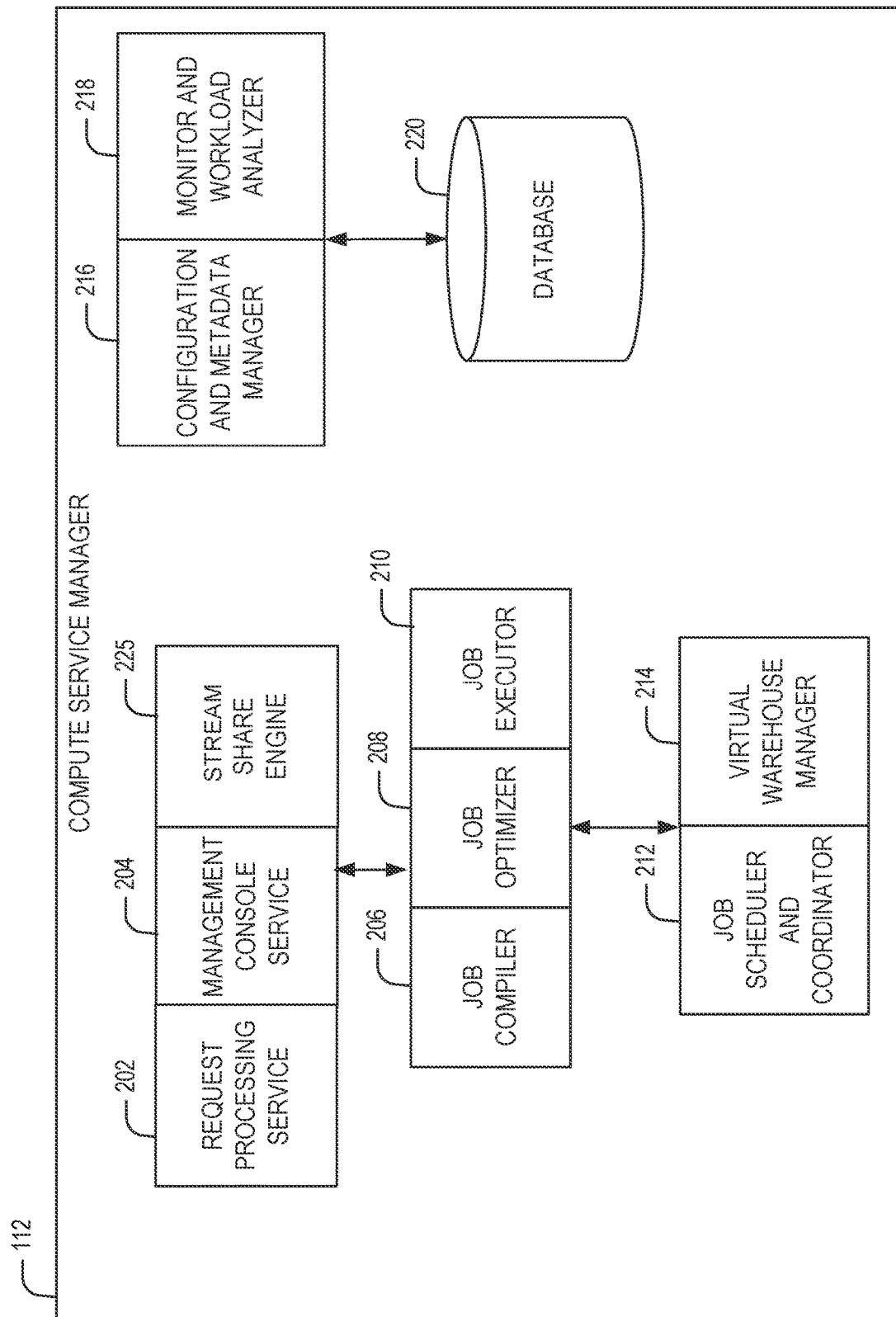
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
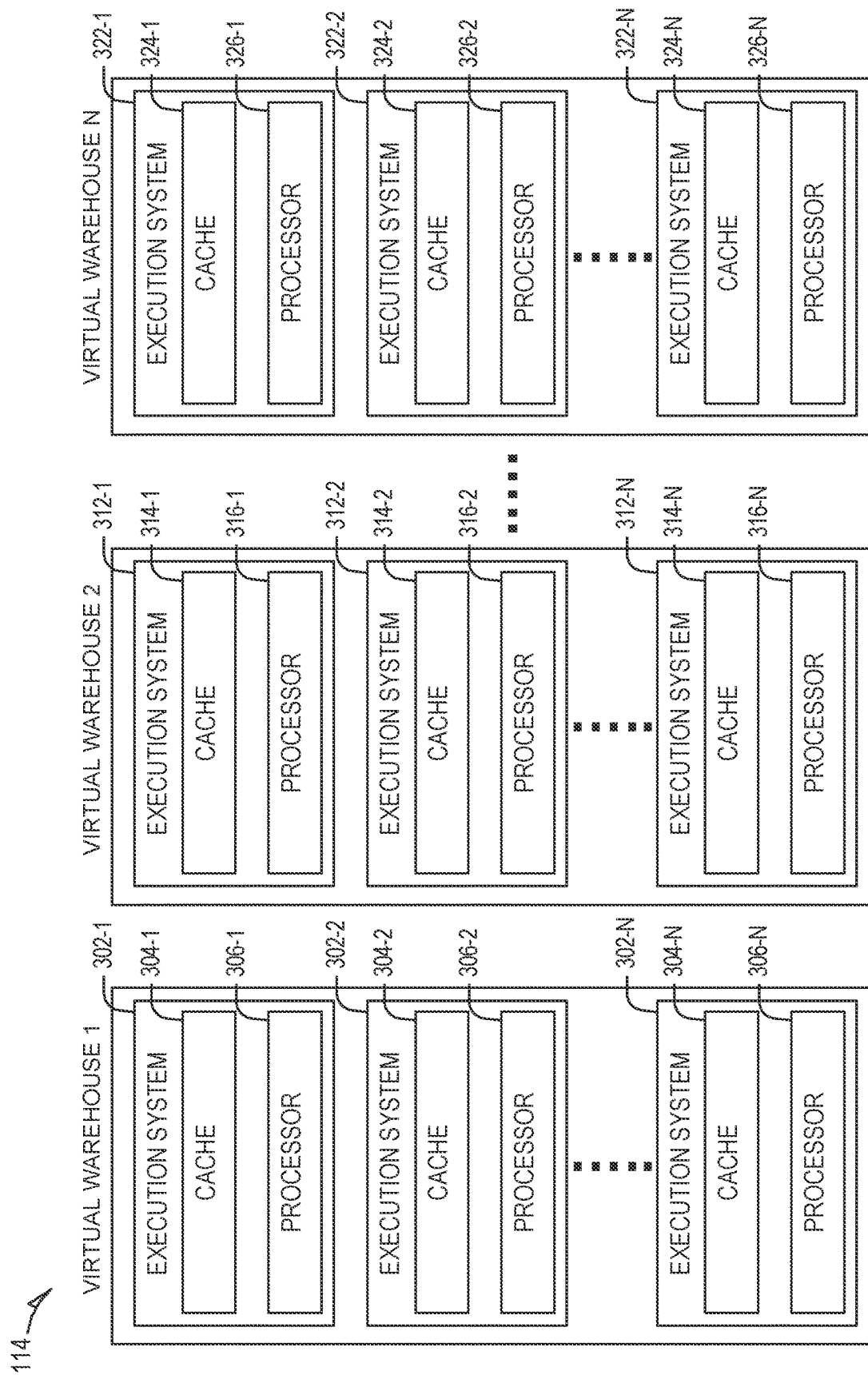
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
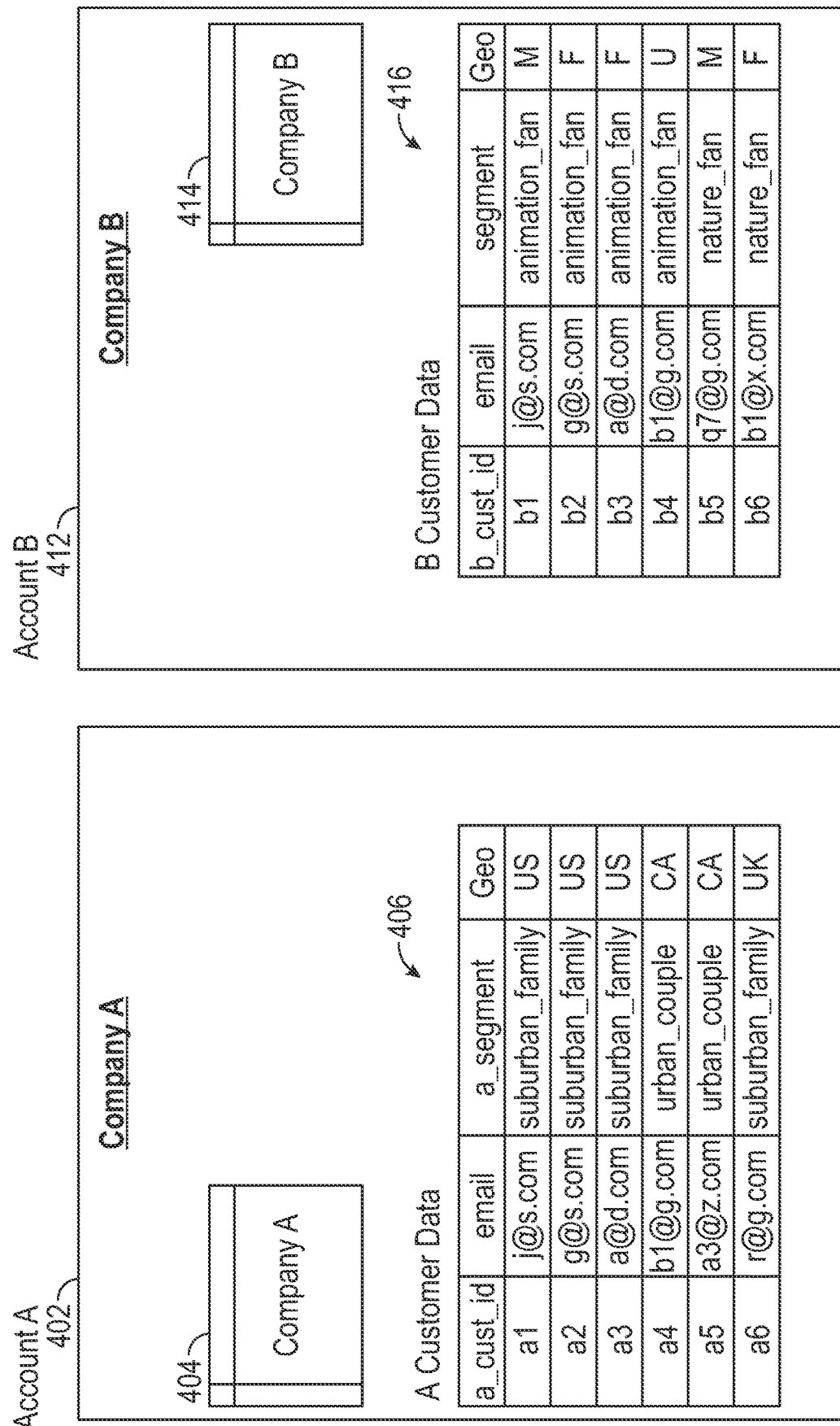
FIG. 4 is a block diagram illustrating accounts in a data warehouse system, according to some example embodiments.

FIG. 4 shows an example of two separate accounts in a data warehouse system, according to some example embodiments. Here, Company A may operate an account A 402 with a network-based data warehouse system as described herein. In account A 402, Company A data 404 may be stored. The Company A data 404 may include, for example, customer data 406 relating to customers of Company A. The customer data 406 may be stored in a table or other format storing customer information and other related information. The other related information may include identifying information, such as email, and other known characteristics of the customers, such as gender, geographic location, purchasing habits, and the like. For example, if Company A is a consumer-goods company, purchasing characteristics may be stored, such as whether the customer is single, married, part of a suburban or urban family, etc. If Company A is a streaming service company, information about the watching habits of customers may be stored, such as whether the customer likes sci-fi, nature, reality, action, etc.

Likewise, Company B may operate an account B 412 with the network-based data warehouse system as described herein. In account B 412, Company B data 414 may be stored. The Company B data 414 may include, for example, customer data relating customers of Company B. The customer data 416 may be stored in a table or other format storing customer information and other related information. The other related information may include identifying information, such as email, and other known characteristics of the customers, such as gender, geographic location, purchasing habits, etc., as described above.

For security reasons, Company A's data may not be accessible to Company B and vice versa. However, Company A and Company B may want to share at least some of their data with each other without revealing sensitive information, such as a customer's personal identity information. For example, Company A and Company B may want to explore cross marketing or advertising opportunities and may want to see how many of their customers overlap and filter based on certain characteristics of the overlapping customers to identify relationships and patterns.

Figure 5:
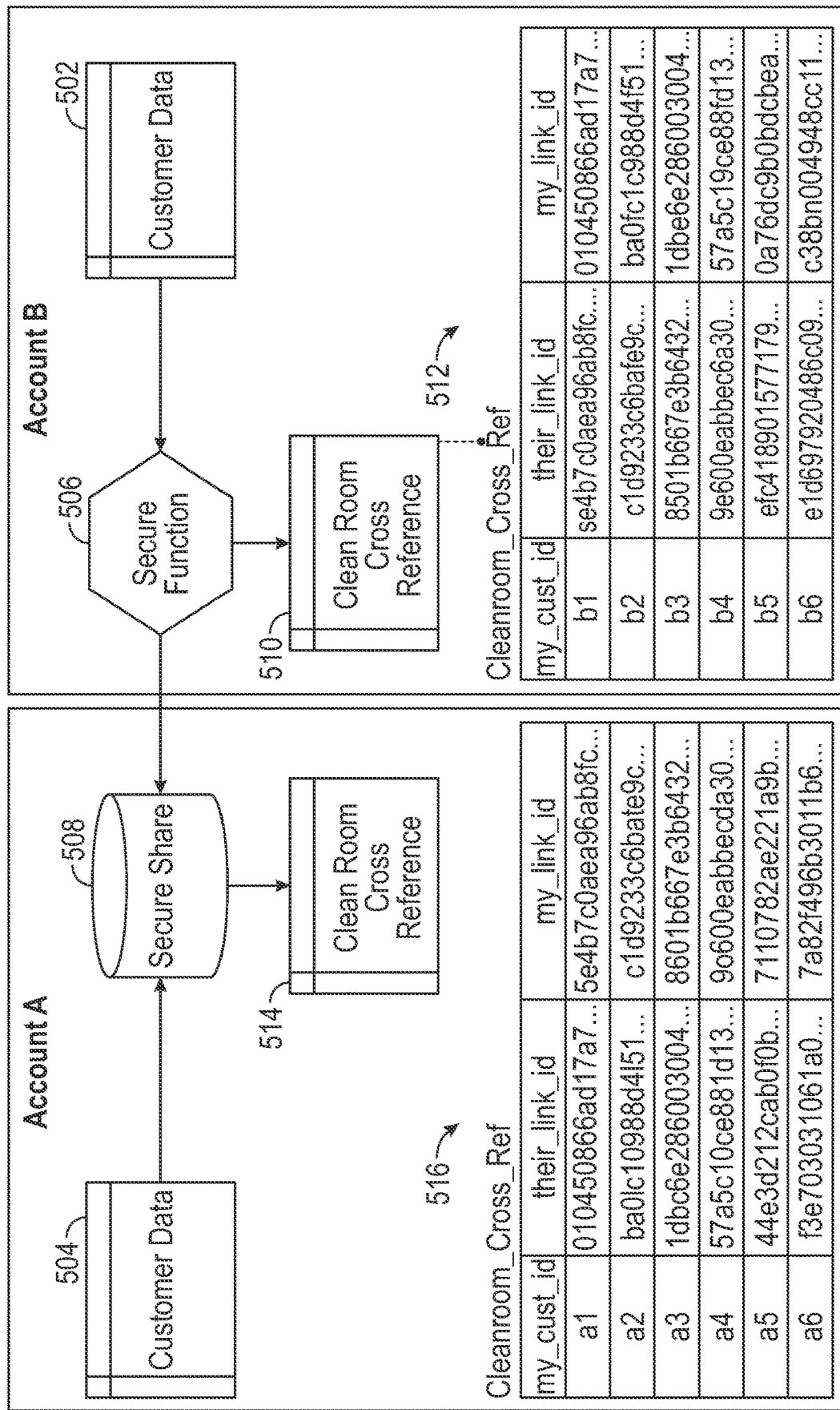
FIG. 5 is a block diagram illustrating a data clean room, according to some example embodiments.

To this end, a data clean room may be provided by the network-based data warehouse system as described herein. FIG. 5 is a block diagram illustrating a method for operating a data clean room, according to some example embodiments. The data clean room may enable companies A and B to perform overlap analysis on their company data, without sharing sensitive data and without losing control over the data. The data clean room may create linkages between the data for each account and may include a set of blind cross reference tables.

Next, example operations to create the data clean room are described. Account B may include customer data 502 for Company B, and account A may include customer data 504 for Company A. In this example, account B may initiate the creation of the data clean room; however, either account may initiate creation of the data clean room. Account B may create a secure function 506. The secure function 506 may look up specific identifier information in account B's customer data 502. The secure function 506 may anonymize the information by creating identifiers for each customer data (e.g., generating a first result set). The secure function 506 may be a secure user-defined function (UDF) and may be implemented using the techniques described in U.S. patent application Ser. No. 16/814,875, entitled "System and Method for Global Data Sharing," filed on Mar. 10, 2020, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

The secure function 506 may be implemented as a SQL UDF. The secure function 506 may be defined to protect the underlying data used to process the function. As such, the secure function 506 may restrict direct and indirect exposure of the underlying data.

The secure function 506 may then be shared with account A using a secure share 508. The secure share 508 may allow account A to execute the secure function 506 while restricting account A from having access to the underlying data of account B used by the function and from being able to see the code of the function. The secure share 508 may also restrict account A from accessing the code of the secure function 506. Moreover, the secure share 508 may restrict account A from seeing any logs or other information about account B's use of the secure function 506 or the parameters provided by account B of the secure function 506 when it is called.

Account A may execute the secure function 506 using its customer data 504 (e.g., generating a second result set). The result of the execution of the secure function 506 may be communicated to account B. For instance, a cross reference table 510 may be created in account B, which may include anonymized customer information 512 (e.g., anonymized identification information). Likewise, a cross reference table 514 may be created in account A, which may include anonymized customer information 516 for matching overlapping customers for both companies, and dummy identifiers for non-matching records. The data from the two companies may be securely joined so that neither account may access the underlying data or other identifiable information. For example, the data may be securely joined using the techniques described in U.S. patent application Ser. No. 16/368,339, entitled "Secure Data Joins in a Multiple Tenant Database System," filed on May 28, 2019, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

For instance, cross reference table 510 (and anonymized customer information 512) may include fields: "my_cust_id," which may correspond to the customer ID in account B's data; "my_link_id," which may correspond to an anonymized link to the identified customer information; and a "their_link_id," which may correspond to an anonymized matched customer in company A. "their_link_id" may be anonymized, so that company B cannot discern the identity of the matched customers. The anonymization may be performed using hashing, encryption, tokenization, or other suitable techniques.

Moreover, to further anonymize the identity, all listed customers of company B in cross reference table 510 (and anonymized customer information 512) may have a unique matched customer from company B listed, irrespective of whether there was an actual match or not. A dummy "their_link_id" may be created for customers not matched. This way neither company may be able to ascertain identity information of the matched customers. Neither company may discern where there is an actual match rather than a dummy returned identifier (no match). Hence, the cross reference tables 510 may include anonymized key-value pairs. A summary report may be created notifying the total number of matches, but other details of the matched customers may not be provided to safeguard the identities of the customers.

Figure 6:
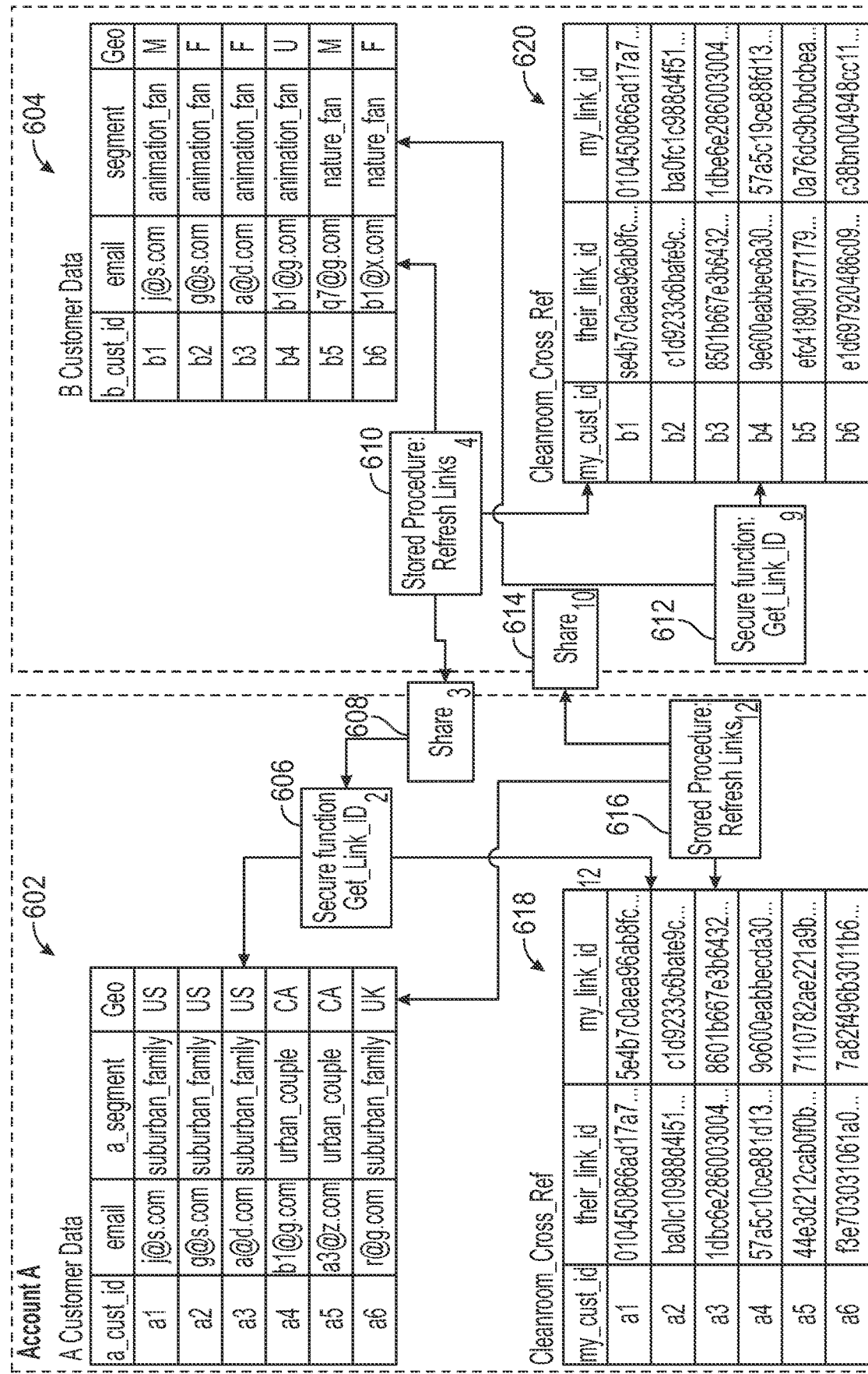
FIG. 6 is a block diagram illustrating a double-blind data clean room, according to some example embodiments.

The data clean room may operate in one or both directions, meaning that a double-blind clean room may be provided. FIG. 6 illustrates is a block diagram illustrating a method for operating a double-blind clean room, according to some example embodiments. The double-blind clean room may enable company A to perform overlap analysis using its company data with the company data of Company B and vice versa, without sharing sensitive data and without losing control over their own data. The double-blind clean room may create linkages between the data for each account and may include a set of double-blind cross reference tables.

Here, account A may include its customer data 602, and account B may include its customer data 604. Account A may create a secure function 606 ("Get_Link_ID"), as described above. The secure function 606 may be shared with account B using a secure share 608, as described above. Moreover, a stored-procedures function 610 may detect changes to data in respective customer data and may update and refresh links accordingly.

The same or similar process may be applied from account B to account A with secure function 612, secure share 614, and stored procedures 616. Consequently, the cross reference table 618 in account A may include information about the customer overlap between the two companies. For example, the cross reference table 618 includes fields: "my_cust_id," which may correspond to the customer ID in account A's data; "my_link_id," which may correspond to an anonymized link to the identified customer information of company A; and a "their_link_id," which may correspond to an anonymized matched customer in company B. The anonymization may be performed using hashing, encryption, tokenization or the like.

Similarly, the cross reference table 620 in account B may include information about the customer overlap between the two companies. For example, the cross reference table 620 includes fields: "my_cust_id," which may correspond to the customer ID in account B's data; "my_link_id," which may correspond to an anonymized link to the identified customer information of company B; and a "their_link_id," which may correspond to an anonymized matched customer in company A. The anonymization may be performed using hashing, encryption, tokenization, or other suitable techniques.

Figure 7:
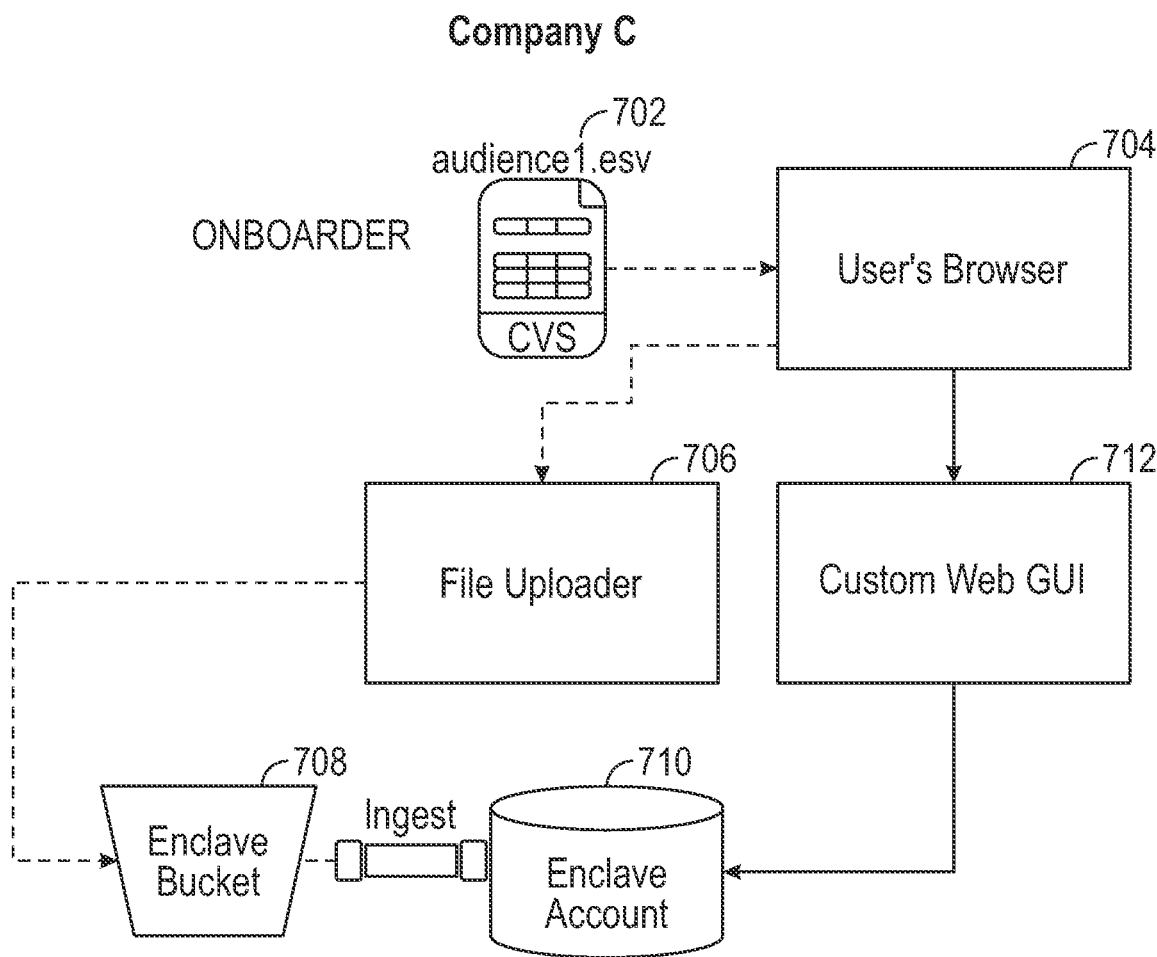
FIG. 7 shows a flow diagram for on-boarding data to a data warehouse system, according to some example embodiments.

In the above examples both company A and B had accounts with the data warehouse system. However, the blind clean room techniques described herein may also find applications when one or both companies do not have accounts with the data warehouse system. FIG. 7 illustrates a technique for on-boarding data to a data warehouse system, according to some example embodiments. Here, Company C may not have an account with the data warehouse system but may still nonetheless want to employ the data clean room techniques described herein. Company C may load its company data into a load file 702 (e.g., a .csv file). Then, using a browser 704 or an app or the like, Company C may use a file uploader 706 upload the load file 702 to a secure cloud storage location 708 (also referred to as "enclave bucket"). From the enclave bucket 708, the data may be moved into an enclave account 710. The data may be moved by a batch data ingestion command, a copy command, or the like. A custom web GUI 712 may also be used to send control information to the enclave account 710. The control information, for example, may set access restrictions for the data in the load file 702. For the purpose of creating and using a data clean room, the enclave account 710 may then function and operate as a regular account, as described above.

After a data clean room is created, the parties may run secure queries on the secure data to gather more detailed information. In the example of securely matching customers of two companies, either company may send a query request to the other company to determine the count of matches based on select conditions.

Figure 8A:
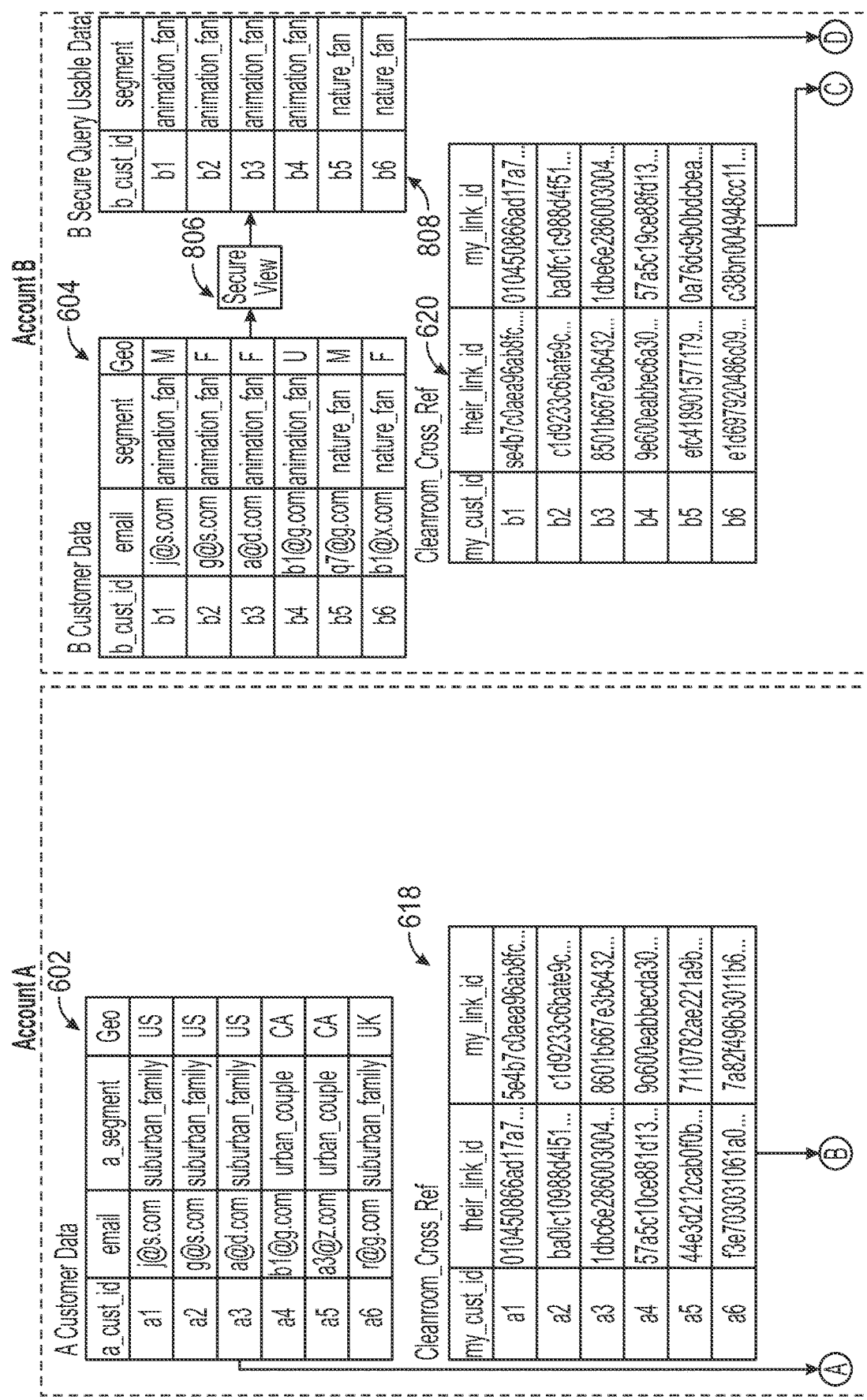
FIGS. 8A-8C is a block diagram illustrating a secure query using a data clean room, according to some example embodiments.
Figure 8B:
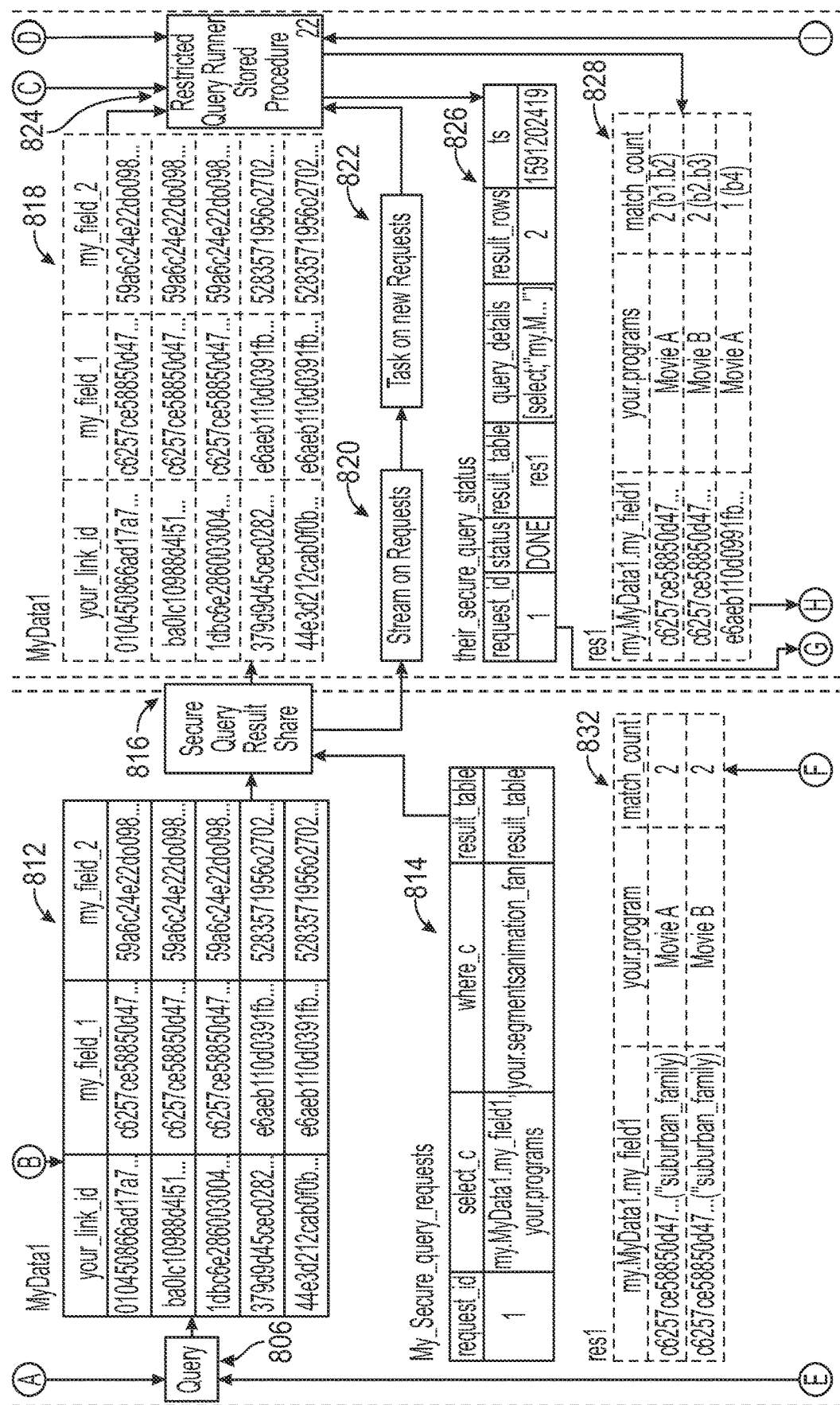
Figure 8C:
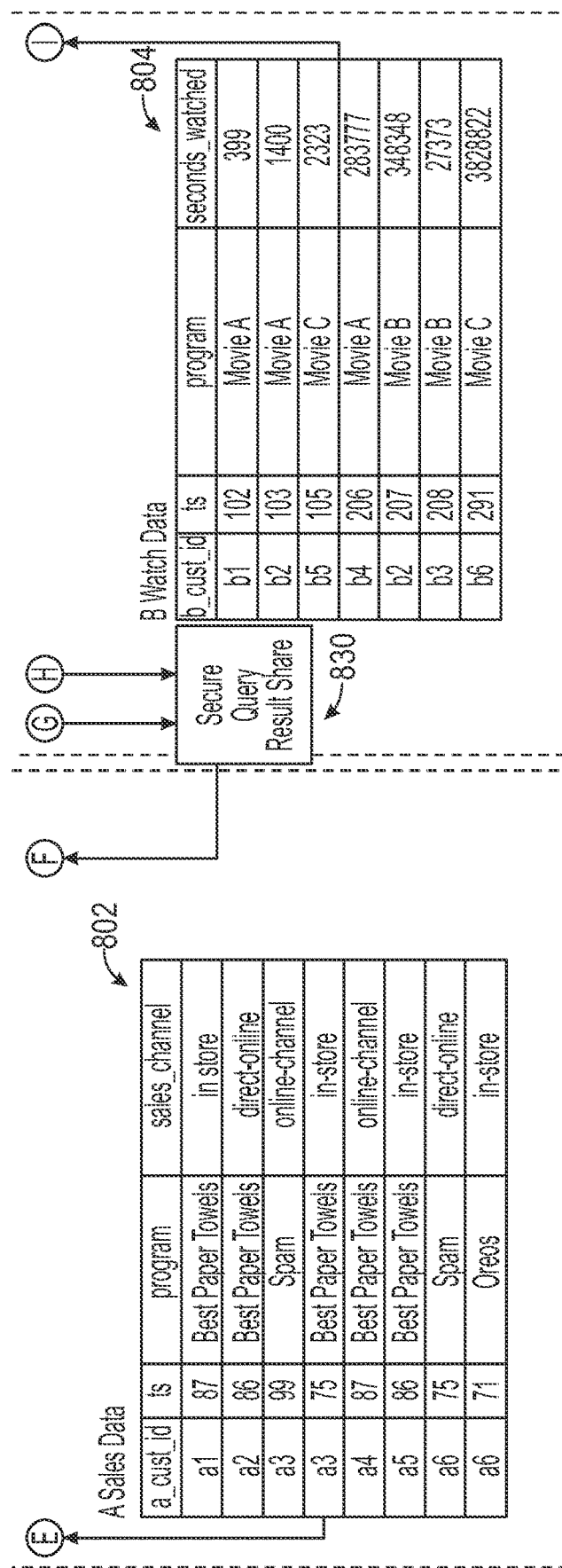

FIGS. 8A-8C is a block diagram illustrating a method for processing a secure query using a data clean room, according to some example embodiments. The example in FIGS. 8A-8C builds on the example data clean room created in FIG. 6. Here, account A may include its customer data 602, and account B may include its customer data 604. As explained above, cross reference tables 618, 620 may be created and included in accounts A and B, respectively. In addition, sales data 802 (shown in FIG. 8C), which includes information related to customers' buying habits, may be included in account A, and watch data 804, which may include information about customers' viewing habits, may be included in account B.

Moreover, account B may use a secure view 806 to allow company A to have access to select data, referred to as secure query usable data 808. Account B may notify account A of this secure query usable data 808 in a variety of ways. Account B may publish this information to account A in advance. It may share the structure and lookup keys of the secure query usable data 808 with account A. It may also use a private data exchange using the techniques described in U.S. patent application Ser. No. 16/746,673, entitled "Private Data Exchange," filed on Jan. 17, 2020, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

A user in account A may run a secure query 810 in the data clean room. The query may request processing of data in both accounts A and B, but may restrict the user from having access to sensitive data of account B. For example, the user may run a query requesting information: How many of my (Company A's) customers have watched one of Company B's programs, grouped by Company B programs and my (Company A's) segments also bought my "Top Paper Towels" product, who I know live in the US or Canada, and who are also animation fans according to Company B, where there are at least two customers in each resulting group?

Using Company A's customer data 602, cross reference table 618, and sales data 802, the query may generate an interim table 812 ("MyData1"). The interim table 812, in this example, may include anonymized Company A's customer information for customers who bought "Top Paper Towels" and who live in the US or Canada securely joined with matching anonymized Company B customers (which may or may not include "dummy" matched accounts as described above). A secure query request 814 may also be generated to send to Company B. The secure query request 814 may request Company B to run the remaining portion of the query and to send back the final results. For example, the secure query request 814 may include a request ID, filters for Company B to apply ("select_c" and "where_c"), and an output format for the final results ("result_table"). The secure query request 814 may be provided in the form of a request table (as shown) or may be another type of remote procedure call, such as a SQL statement. The interim table 812 and secure query request 814 may be shared with account B using secure query request share 816.

Next, account B may complete the remaining portion of the original query. At account B, a copy of the interim table 818 may be stored. The secure query request 814 may be received by a stream on request 820 and task on new request 822 functions. The secure query may then be executed by a restricted query procedure function 824. This function may use data from a variety of sources, such as the copy of the interim table 818, the cross reference table 620, the watch data 804, and the secure query usable data 808, to execute the query. In this example, the restricted query procedure function 824 may filter customers identified in the interim table 818 by those who have watched one of Company B's program and are animation fans, and the function may group the results by the program and Company A's segments, as shown in a query status 826. The results may be generated and output to an interim result table 828. Next, the last part of the query may be performed: filter out results with fewer than two customers in each resulting group (e.g., a minimum threshold). In the example shown in FIGS. 8A-8C, the group for "Movie B" and a particular Company A segment had only one result, so it was removed. The final results may then be shared with account A using a secure query result share function 830. The results in account A may be provided as a final result table 832 ("res1") showing the matches of the query grouped by the two programs.

Figure 9:
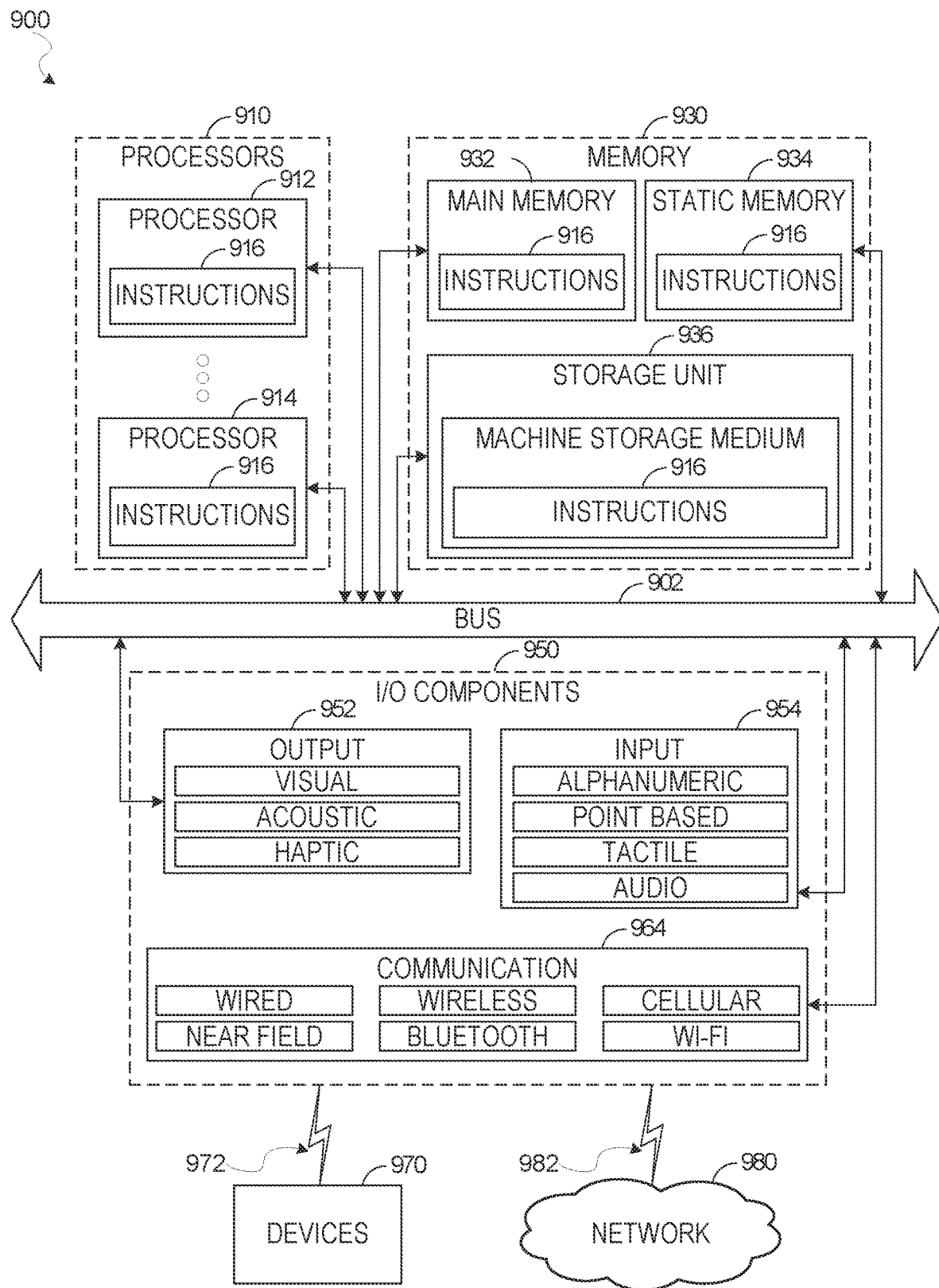
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implemented portions of the data flows described herein. In this way, the instructions 916 transform a general, non-programmed machine into a particular machine 900 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 110, the compute service manager 112, the execution platform 114, the access management system 118, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: providing a first party data in a first account; providing a second party data in a second account; executing, by a processor, a secure function using the first party data to generate a first result, including creating links to the first party data and anonymizing identification information in the first party data; sharing the secure function with the second account; executing the secure function using the second party data to generate a second result and restricting the second account from accessing the first party data; and generating a cross reference table with the first and second results, the cross reference table providing anonymized matches of the first and second results.

Example 2. The method of example 1, further comprising: restricting the second account from accessing a code of the secure function.

Example 3. The method of any of examples 1-2, further comprising: restricting the second account from logs related to execution of the first portion of the secure function.

Example 4. The method of any of examples 1-3, further comprising: generating dummy matching information in the second result for an instance of no match.

Example 5. The method of any of examples 1-4, further comprising: generating a summary report of the anonymized matches.

Example 6. The method of any of examples 1-5, further comprising: restricting access to the number of matches when the number of matches is below a minimum threshold.

Example 7. The method of any of examples 1-6, wherein providing the first party data includes: uploading a load file to a secure cloud storage location; storing data from the load file into an enclave account; and setting access restrictions for the data from the load file based on control information.

Example 8. The method of any of examples 1-7, further comprising: receiving a query request; based at least on the first party data and the cross reference table, executing a first portion of the query request; generating an interim table based on executing the first portion of the query request; generating a secure query request, including instructions related to executing a second portion of the query request; and sharing the secure query request and the interim table with the second account.

Example 9. The method of any of examples 1-8, further comprising: at the second account, executing the secure query request and joining results of the secure query requests with information from the interim table to generate final results of the query request.

Example 10. A system comprising: one or more processors of a machine; and a memory storing instructions that, when executed by the one or more processors, cause the machine to perform operations implementing any one of example methods 1 to 9.

Example 11. A machine-readable storage device embodying instructions that, when executed by a machine, cause the machine to perform operations implementing any one of example methods 1 to 9.

What is claimed is:

1. A method comprising:
providing a first party data in a first account in a network-based data system;
providing a second party data in a second account in the network-based data system;
executing, by a processor, a secure function using the first party data to generate a first result, including creating links to the first party data and anonymizing identification information in the first party data;
sharing the secure function with the second account;
executing the secure function using the second party data to generate a second result and restricting the second account from accessing the first party data;
generating a cross reference table with the first and second results, the cross reference table providing anonymized matches of the first and second results;
receiving a query request related to the first and second party data;
based on the cross reference table and the first party data, executing a first portion of the query request to generate results of the first portion of the query request;
sharing a secure query request and the results of the first portion of the query request with the second account, the secure query request including instructions to execute a second portion of the query request; and
receiving final results of the query request from the second account.

2. The method of claim 1, further comprising:
generating an interim table with the results of the first portion of the query request; and
sharing the interim table with the second account.

3. The method of claim 2, further comprising:
at the second account, executing the secure query request and joining results of the secure query request with the results of the first portion of the query request from the interim table to generate the final results of the query request.

4. The method of claim 1, further comprising:
generating dummy matching information in the second result for an instance of no match.

5. The method of claim 1, further comprising:
restricting the second account from accessing a code of the secure function; and
restricting the second account from logs related to execution of the first portion of the secure function.

6. The method of claim 1, further comprising:
generating a summary report of the anonymized matches; and
restricting access to the anonymized matches when the number of matches is below a minimum threshold.

7. The method of claim 1, wherein providing the first party data includes:
uploading a load file to a secure cloud storage location;
storing data from the load file into an enclave account; and
setting access restrictions for the data from the load file based on control information.

8. A machine-storage medium embodying instructions that, when executed by a machine, cause the machine to perform operations comprising:
providing a first party data in a first account in a network-based data system;
providing a second party data in a second account in the network-based data system;
executing a secure function using the first party data to generate a first result, including creating links to the first party data and anonymizing identification information in the first party data;
sharing the secure function with the second account;
executing the secure function using the second party data to generate a second result and restricting the second account from accessing the first party data;
generating a cross reference table with the first and second results, the cross reference table providing anonymized matches of the first and second results;
receiving a query request related to the first and second party data;
based on the cross reference table and the first party data, executing a first portion of the query request to generate results of the first portion of the query request;
sharing a secure query request and the results of the first portion of the query request with the second account, the secure query request including instructions to execute a second portion of the query request; and
receiving final results of the query request from the second account.

9. The machine-storage medium of claim 8, further comprising:
generating an interim table with the results of the first portion of the query request; and
sharing the interim table with the second account.

10. The machine-storage medium of claim 9, further comprising:
at the second account, executing the secure query request and joining results of the secure query request with the results of the first portion of the query request from the interim table to generate the final results of the query request.

11. The machine-storage medium of claim 8, further comprising:
generating dummy matching information in the second result for an instance of no match.

12. The machine-storage medium of claim 8, further comprising:
restricting the second account from accessing a code of the secure function; and
restricting the second account from logs related to execution of the first portion of the secure function.

13. The machine-storage medium of claim 8, further comprising:
generating a summary report of the anonymized matches; and
restricting access to the anonymized matches when the number of matches is below a minimum threshold.

14. A system comprising:
one or more processors of a machine; and
a memory storing instructions that, when executed by the one or more processors, cause the machine to perform operations comprising:
providing a first party data in a first account in a network-based data system;
providing a second party data in a second account in the network-based data system;
executing a secure function using the first party data to generate a first result, including creating links to the first party data and anonymizing identification information in the first party data;
sharing the secure function with the second account;
executing the secure function using the second party data to generate a second result and restricting the second account from accessing the first party data;
generating a cross reference table with the first and second results, the cross reference table providing anonymized matches of the first and second results;
receiving a query request related to the first and second party data;
based on the cross reference table and the first party data, executing a first portion of the query request to generate results of the first portion of the query request;
sharing a secure query request and the results of the first portion of the query request with the second account, the secure query request including instructions to execute a second portion of the query request; and
receiving final results of the query request from the second account.

15. The system of claim 14, the operations further comprising:
generating an interim table with the results of the first portion of the query request; and
sharing the interim table with the second account.

16. The system of claim 15, the operations further comprising:
at the second account, executing the secure query request and joining results of the secure query request with the results of the first portion of the query request from the interim table to generate the final results of the query request.

17. The system of claim 14, the operations further comprising:
generating dummy matching information in the second result for an instance of no match.

18. The system of claim 14, the operations further comprising:
restricting the second account from accessing a code of the secure function; and
restricting the second account from logs related to execution of the first portion of the secure function.

19. The system of claim 14, the operations further comprising:
generating a summary report of the anonymized matches; and
restricting access to the anonymized matches when the number of matches is below a minimum threshold.

20. The system of claim 14, wherein providing the first party data includes:
- uploading a load file to a secure cloud storage location;
- storing data from the load file into an enclave account; and
- setting access restrictions for the data from the load file based on control information.

\* \* \* \* \*